United States Patent [19]
Odagaki et al.

[11] Patent Number: 5,269,581
[45] Date of Patent: Dec. 14, 1993

[54] STORAGE STRUCTURE FOR COLLAPSIBLE SEAT

[75] Inventors: Kunimichi Odagaki; Katsumi Hatanaka, both of Tochigi, Japan

[73] Assignee: Honda Giken Kogyo Kabushiki Kaisha, Tokyo, Japan

[21] Appl. No.: 971,238

[22] Filed: Nov. 4, 1992

[30] Foreign Application Priority Data

Nov. 5, 1991 [JP] Japan .......................... 3-099102[U]

[51] Int. Cl.$^5$ ................................................ B60N 3/04
[52] U.S. Cl. .................................. 296/66; 296/65.1; 297/15
[58] Field of Search .................... 296/65.1, 66; 297/15

[56] References Cited

U.S. PATENT DOCUMENTS

| | | | |
|---|---|---|---|
| 1,158,223 | 10/1915 | Huschle, Jr. ........................ | 296/66 |
| 3,151,906 | 10/1964 | Roberts ............................... | 296/66 |
| 3,227,488 | 1/1966 | Kasbab et al. ...................... | 296/66 X |

FOREIGN PATENT DOCUMENTS 881601  4/1943  France .................................. 296/66

Primary Examiner—Joseph D. Pape
Attorney, Agent, or Firm—Armstrong, Westerman, Hattori, McLeland & Naughton

[57] ABSTRACT

A collapsible automobile seat pivotally mounted on an automobile floor having a storage recess defined therein. The collapsible automobile seat comprises a seat cushion pivotally coupled to the automobile floor and a seat back pivotally coupled to the seat cushion, the seat cushion having a lower surface normally facing the automobile floor. After the seat back is folded against the seat cushion, the automobile seat is angularly moved into a position in which the seat cushion and the seat back are fully stored in the storage recess with the lower surface facing upwardly and lying substantially flush with the automobile floor.

6 Claims, 3 Drawing Sheets

STORAGE STRUCTURE FOR COLLAPSIBLE SEAT

BACKGROUND OF THE INVENTION

1. Field of the Invention

The present invention relates to a storage structure for storing a collapsible seat such as a collapsible automobile seat.

2. Description of the Relevant Art

Some wagon-type automobiles have first, second, and third rows of passenger seats that are successively arranged in tandem. The third row of passenger seats, which are positioned behind the second row of passenger seats, are usually collapsible so that, when not in use, they can be folded to create a cargo space for placing luggage or other cargo. However, since the collapsed passenger seats project on the floor of the wagon, they tend to interfere with the loaded cargo or to present an obstacle to neat loading of the cargo.

SUMMARY OF THE INVENTION

It is therefore an object of the present invention to provide a storage structure for storing a collapsible seat.

According to the present invention, there is provided a storage structure for storing a collapsible seat, comprising a floor having a storage recess defined therein, and a collapsible seat pivotally mounted on the floor and having a lower surface normally facing the floor, the collapsible seat being angularly movable, after collapsed, fully into the storage recess until the lower surface faces upwardly and lies substantially flush with the floor.

The collapsible seat comprises a seat cushion pivotally coupled to the floor and a seat back pivotally coupled to the seat cushion, the seat cushion having the lower surface, whereby the seat back is foldable against the seat cushion when the collapsible seat is collapsed.

The seat cushion is pivotally coupled to the floor at an edge of the storage recess. A support leg is pivotally coupled to the lower surface, the support leg resting on the floor before the collapsible seat is angularly moved into the storage recess.

According to the present invention, there is also provided a storage structure for storing a collapsible seat, comprising a floor having a storage recess defined therein, and a collapsible seat pivotally mounted on the floor and comprising a seat cushion pivotally coupled to the floor and a seat back pivotally coupled to the seat cushion, the seat cushion having a lower surface normally facing the floor, the collapsible seat being angularly movable, after the seat back is folded against the seat cushion, from a first position in which the seat cushion is placed on the floor into a second position in which the seat cushion and the seat back are fully stored in the storage recess with the lower surface facing upwardly and lying substantially flush with the floor.

According to the present invention, there is further provided a storage structure for storing a collapsible automobile seat, comprising an automobile floor having a storage recess defined therein, and a collapsible automobile seat pivotally mounted on the automobile floor and comprising a seat cushion pivotally coupled to the automobile floor and a seat back pivotally coupled to the seat cushion, the seat cushion having a lower surface normally facing the automobile floor, the collapsible seat being angularly movable, after the seat back is folded against the seat cushion, into a position in which the seat cushion and the seat back are fully stored in the storage recess with the lower surface facing upwardly and lying substantially flush with the automobile floor.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
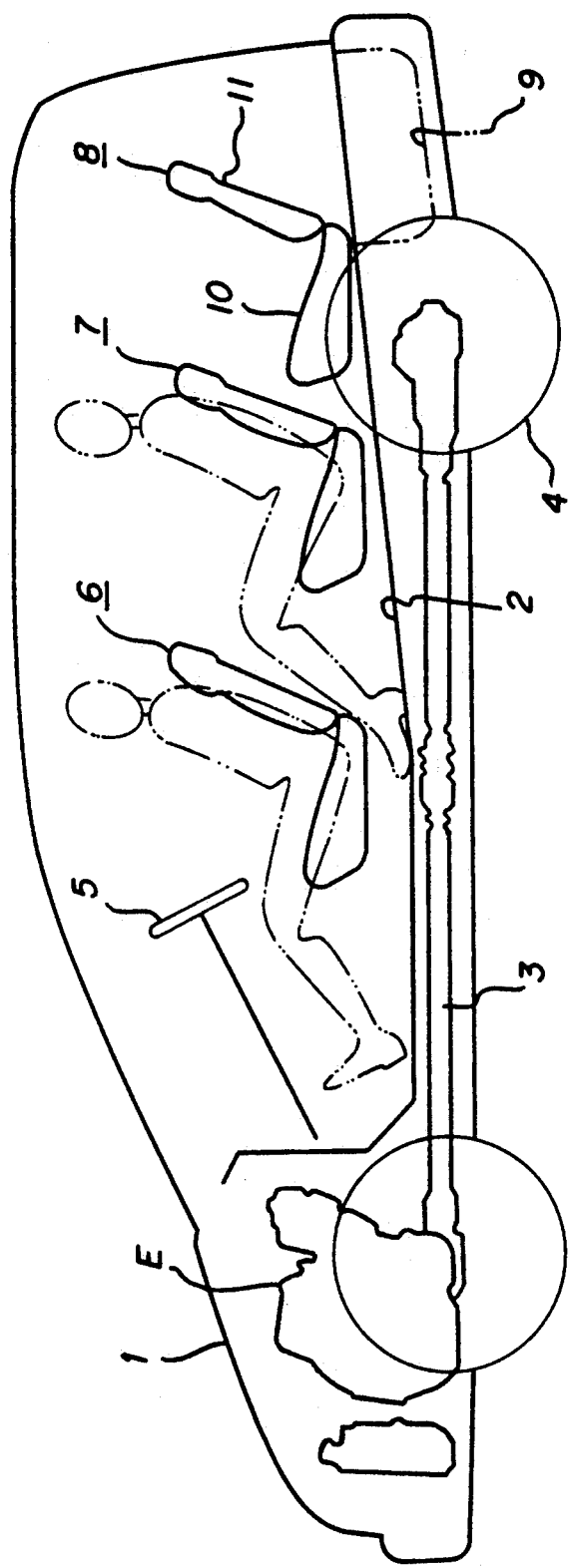
FIG. 1 is a schematic side elevational view of a wagon-type automobile incorporating a storage structure for a collapsible seat according to the present invention.

As shown in FIG. 1, a wagon-type automobile incorporating a storage structure for a collapsible seat according to the present invention has a body including an engine hood 1 housing an engine E and a floor 2 below which a drive shaft 3 extends from the engine E. The drive shaft 3 is operatively connected to rear road wheels 4 to transmit drive power from the engine E to the rear road wheels 4.

The floor 2 supports thereon a first row of seats (front seats) 6 including a driver's seat behind a steering wheel 5, a second row of seats (rear seats) 7 behind the front seats 6, and a third row of seats 8 behind the rear seats 7. The first, second, and third rows of seats 6, 7, 8 are successively arranged in tandem. The floor 2 also has an upwardly opening storage recess 9 defined therein behind the third row of seats 8.

Figure 2:
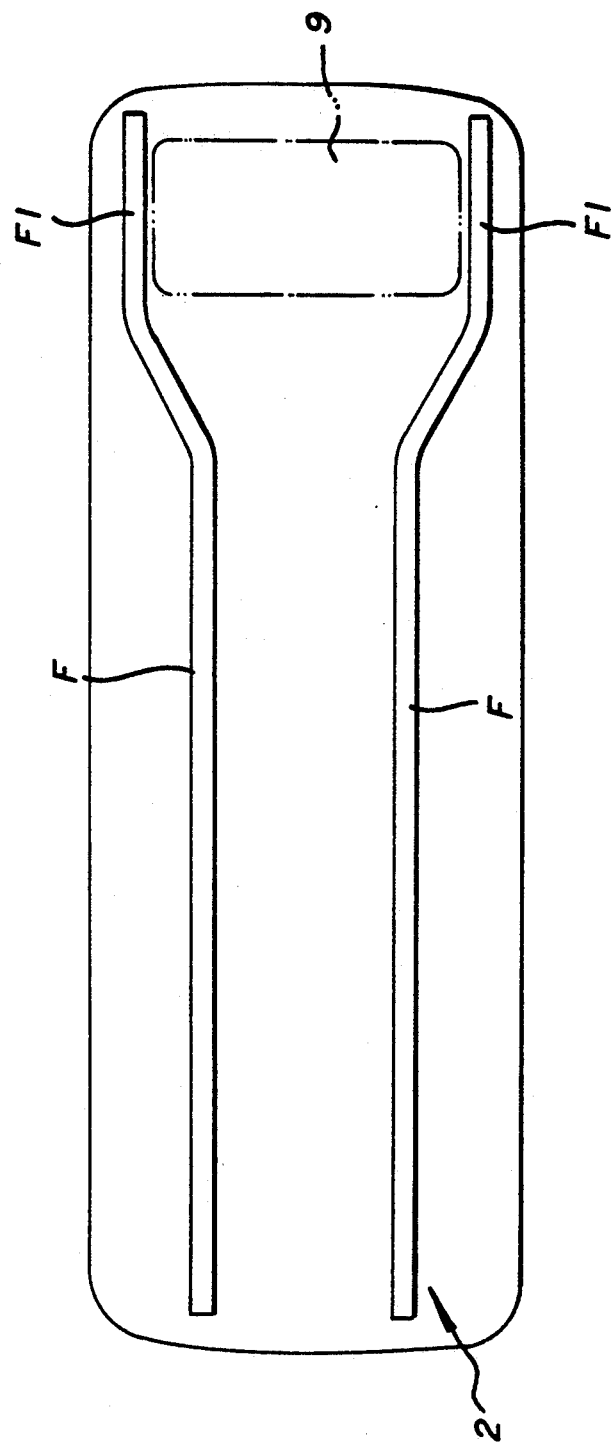
FIG. 2 is a schematic plan view of the floor of the wagon-type automobile shown in FIG. 1.

As shown in FIG. 2, the floor 2 has a pair of laterally spaced parallel floor frames F having respective rear portions F1 bent away from each other with the storage recess 9 positioned therebetween. The storage recess 9 is therefore of a relatively large width extending fully up to the rear portions F.

Figure 3:
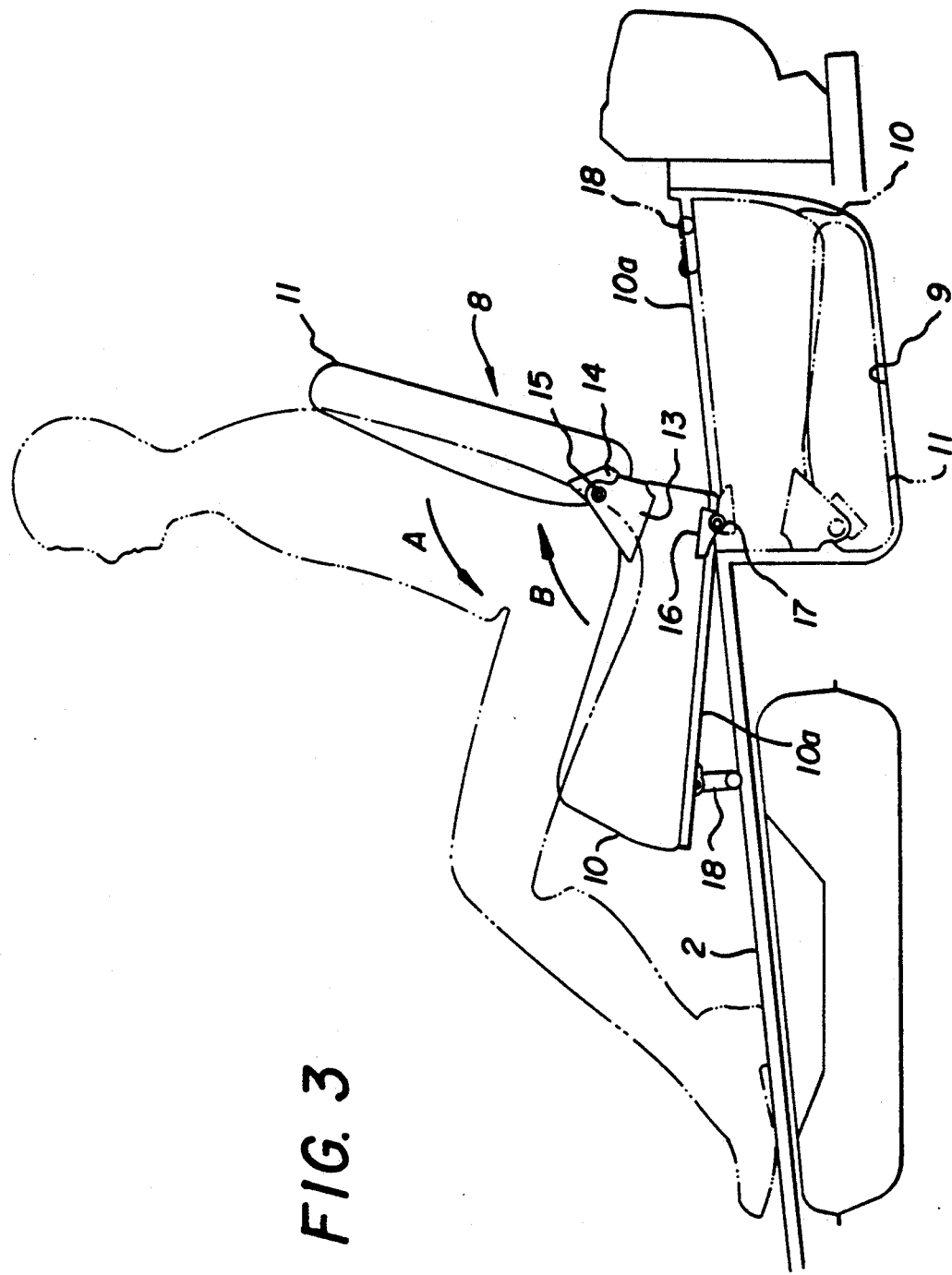
FIG. 3 is an enlarged side elevational view of the storage structure and a collapsible seat that can be stored in the storage structure.

In FIG. 3, each of the seats 8 is a collapsible seat composed of a seat cushion 10 and a seat back 11 pivotally joined thereto. A bracket 13 is fixed to a rear portion of the seat cushion 10, and a bracket 14 is fixed to a lower portion of the seat back 11. The brackets 13, 14 are pivotally connected to each other by a pivot shaft 15. The seat back 11 is angularly movable about the pivot shaft 15 in a forward direction indicated by the arrow A until it is folded over the seat cushion 10. The seat cushion 10 and the seat back 11 have respective stoppers (not shown) which engage each other to prevent the seat back 11 from swinging back away from the seat cushion 10 beyond the solid-line position.

Another bracket 16 is mounted on a lower side portion of the seat cushion 10, and is pivotally supported by a pivot shaft 17 on the floor 2 at a lateral edge of the storage recess 9. A support leg 18 is angularly movably attached to a front portion of a lower surface 10a of the seat cushion 10 which normally faces the floor 2. When the seat 8 is in use as indicated by the solid lines in FIG. 3, the support leg 18 extends downwardly and rests on the floor 2 to keep the seat cushion 10 inclined as shown.

The seat 8 can collapsed from the solid-line position and stored into the storage recess 9 as follows:

First, the seat back 11 is folded forwardly in the direction A about the pivot shaft 15 until it is brought down against the seat cushion 10. Then, the seat cushion 10 with the seat back 11 held closely thereagainst is angularly moved about the pivot shaft 17 through about 180° in the direction indicated by the arrow B until the seat back 11 and the seat cushion 10 are fully placed in the storage recess 9, as indicated by the imaginary lines in FIG. 3. When the seat back 11 and the seat cushion 10 are fully stored in the storage recess 9, the seat back 11 is positioned on the bottom of the storage recess 9 and the seat cushion 10 is placed on the seat back 11, with the lower surface 10a of the seat cushion 10 facing upwardly and lying substantially flush with the floor 2. Finally, the support leg 18 is folded down against the lower surface 10a of the seat cushion 10.

With the seat 8 thus collapsed and stored in the storage recess 9, the seat 8 is completely accommodated in the storage recess 9, and the lower surface 10a of the seat cushion 10 lies substantially flush with the floor 2. Therefore, a large cargo space is created behind the rear seats 7. As the lower surface 10a of the seat cushion 10 lies substantially flush with the floor 2, no obstructive member projects upwardly from the floor 2 behind the rear seats 7. Accordingly, desired luggage or cargo can neatly be placed in the large cargo space on the floor 2 behind the rear seats 7.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. A storage structure for storing a collapsible sear, comprising:
    a floor having a storage recess defined therein;
    a collapsible seat including a seat cushion having a rearward end pivotally coupled to said floor and a seat back pivotally coupled to said rearward end of said seat cushion, said seat cushion having a lower surface,
    wherein said seat back is foldable against said seat cushion when said collapsible seat is in a collapsed state,
    wherein said collapsible seat is angularly movable in a collapsed state, falling into said storage recess until said lower surface faces upwardly and lies substantially flush with said floor, and
    wherein said storage structure further includes a support leg pivotally coupled to said lower surface, said support leg resting on said floor before the collapsible seat is angularly moved into said storage recess.

2. A storage structure according to claim 1, wherein said seat cushion is pivotally coupled to said floor at an edge of said storage recess.

3. A storage structure for storing a collapsible seat, comprising:
    a floor having a storage recess defined therein; and
    a collapsible seat pivotally mounted on said floor and comprising a seat cushion pivotally coupled to said floor and a seat back pivotally coupled to said seat cushion, said seat cushion having a lower surface normally facing said floor, said collapsible seat being angularly movable, after said seat back is folded against said seat cushion, from a first position in which said seat cushion is placed on said floor into a second position in which said seat cushion and said seat back are fully stored in said storage recess with said lower surface facing upwardly and lying substantially flush with said floor,
    wherein said storage structure further includes a support leg pivotally coupled to said lower surface, said support leg resting on said floor before the collapsible seat is angularly moved into said second position.

4. A storage structure according to claim 3, wherein said seat cushion is pivotally coupled to said floor at an edge of said storage recess.

5. A storage structure for storing a collapsible automobile seat, comprising:
    an automobile floor having a storage recess defined therein; and
    a collapsible automobile seat pivotally mounted on said automobile floor and comprising a seat cushion pivotally coupled to said automobile floor and a seat back pivotally coupled to said seat cushion, said seat cushion having a lower surface normally facing said automobile floor, said collapsible seat being angularly movable, after said seat back is folded against said seat cushion, into a position in which said seat cushion and said seat back are fully stored in said storage recess with said lower surface facing upwardly and lying substantially flush with said automobile floor,
    wherein said storage structure further includes a support leg pivotally coupled to said lower surface, said support leg resting on said automobile floor before the collapsible seat is angularly moved into said position.

6. A storage structure according to claim 5, wherein said seat cushion is pivotally coupled to said automobile floor at an edge of said storage recess.

* * * * *